US010595364B2

(12) United States Patent
Zhou et al.

(10) Patent No.: US 10,595,364 B2
(45) Date of Patent: Mar. 17, 2020

(54) MULTICAST MULTI-USER GROUP

(71) Applicant: Hewlett Packard Enterprise Development LP, Houston, TX (US)

(72) Inventors: Qiang Zhou, Beijing (CN); Shahnawaz Siraj, San Jose, CA (US); Sachin Ganu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/580,095

(22) PCT Filed: Oct. 28, 2016

(86) PCT No.: PCT/CN2016/103757
§ 371 (c)(1),
(2) Date: May 3, 2018

(87) PCT Pub. No.: WO2018/076279
PCT Pub. Date: May 3, 2018

(65) Prior Publication Data
US 2019/0289670 A1    Sep. 19, 2019

(51) Int. Cl.
*H04W 88/10* (2009.01)
*H04B 7/0452* (2017.01)
(Continued)

(52) U.S. Cl.
CPC .......... *H04W 88/10* (2013.01); *H04B 7/0452* (2013.01); *H04W 4/08* (2013.01);
(Continued)

(58) Field of Classification Search
CPC ... H04W 88/10; H04W 4/08; H04W 72/0446; H04W 84/12; H04W 76/40; H04W 4/06; H04B 7/0452
See application file for complete search history.

(56) References Cited

U.S. PATENT DOCUMENTS

2008/0186896 A1    8/2008    Fanfelle et al.
2011/0164578 A1    7/2011    Kim et al.
(Continued)

FOREIGN PATENT DOCUMENTS

| CN | 101034923 A | 9/2007 |
|----|-------------|--------|
| CN | 102158320 A | 8/2011 |
| CN | 102386958 A | 3/2012 |

OTHER PUBLICATIONS

Extended European Search Report and Written Opinion received for EP Patent Application No. 16898877.2, dated Sep. 20, 2018, 14 pages.
(Continued)

*Primary Examiner* — Walter J DiVito
(74) *Attorney, Agent, or Firm* — Brooks, Cameron & Huebsch, PLLC

(57) ABSTRACT

Example implementations relate to multicast multi-user grouping. For example, an apparatus may comprise a processing resource that may rank a plurality of stations associated with the apparatus based on a characteristic associated with a first multicast group containing a first set of stations among the plurality of stations, and a characteristic associated with a second multicast group containing a second set of stations among the plurality of stations. The processing resource may assign a first group of stations from the first multicast group and the second multicast group to a first multi-user group and assign a second group of stations from the first multicast group and the second multicast group to a second multi-user group. The processing resource may convert a multicast frame associated with a station from the first multi-user group to a unicast frame, and transmit the unicast frame to each station in the first multi-user group.

18 Claims, 5 Drawing Sheets

(51) Int. Cl.
*H04W 4/08* (2009.01)
*H04W 72/04* (2009.01)
*H04W 76/40* (2018.01)
*H04W 84/12* (2009.01)

(52) U.S. Cl.
CPC ....... *H04W 72/0446* (2013.01); *H04W 76/40* (2018.02); *H04W 84/12* (2013.01)

(56) References Cited

U.S. PATENT DOCUMENTS

2012/0327838 A1    12/2012   Seok
2016/0330714 A1*   11/2016   Hedayat ............ H04W 72/1289

OTHER PUBLICATIONS

International Searching Authority, The International Search Report and the Written Opinion, dated Jul. 14, 2017, PCT/CN2016/103757, 11 Pgs.

* cited by examiner

MULTICAST MULTI-USER GROUP

BACKGROUND

Stations (STAs) may be assigned to multicast group and/or multi-user multi-input-multi-output groups. Information may be multicast to a group of STAs and/or unicast to respective STAs among a group of STAs.

DETAILED DESCRIPTION

Figure 1:
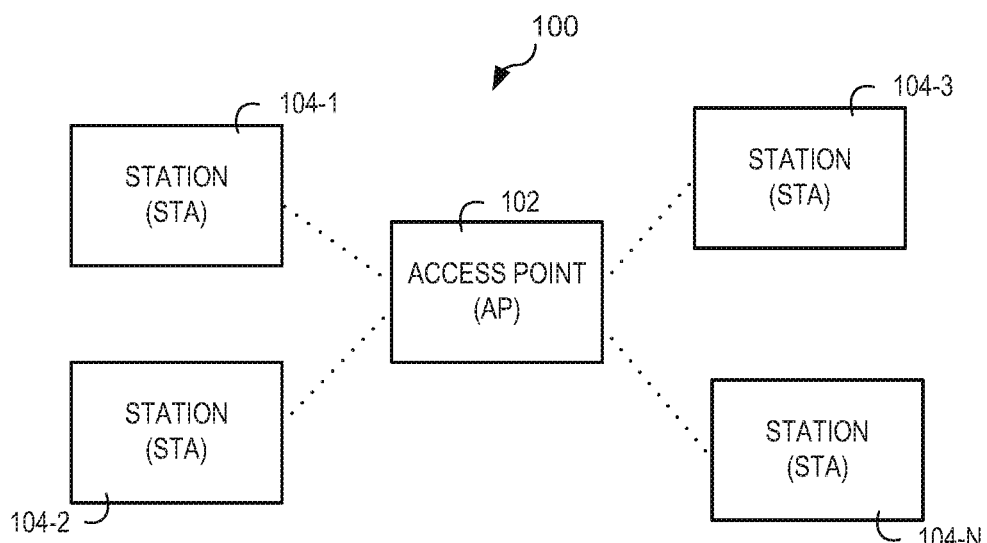
FIG. 1 illustrates a diagram of an example of a wireless network consistent with the disclosure.

Wireless networks may be deployed to provide various types of communication to multiple users through the air using electromagnetic waves. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). As used herein, wireless local area network (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations (STAs) and/or access points (APs) that may communicate over a plurality of wireless channels. WLANs may include multiple stations (STAs) and/or access points (APs) that may communicate over a plurality of wireless channels. An AP may be a networking hardware device that allows a wireless-compliant device (e.g., a STA) to connect to a network.

An AP may provide connectivity with a network such as the Internet to the STAs. As used herein, AP generally refers to receiving points for any known or convenient wireless technology which may later become known. Specifically, the term AP is not intended to be limited to Institute of Electrical and Electronics Engineers (IEEE) 802.11-based APs. APs generally function as an electronic device that is adapted to allow wireless devices to connect to a wired network via various communications standards. As used herein, a STA is a device that has the capability to use the Institute of Electrical and Electronics Engineers (IEEE) 802.11 protocol. Examples of STAs include smart phones, laptops, physical non-virtualized computing devices, personal digital assistants, etc. In some examples, a STA may be a device that contains an IEEE 802.11-conformant media access control (MAC) and physical layer (PHY) interface to a wireless medium (WM).

Wireless networks such as WLANs can use various wireless communication technologies. In some examples, WLANs can use orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. For example, some wireless networks may include APs and/or STAs that may be used to facilitate communication in the network. Such networks may allow for multiple user (MU) MIMO communication. WLANs such as those defined in the IEEE wireless communications standards (e.g., IEEE 802.11a, IEEE 802.11n, IEEE 802.11ac, etc.), can use OFDM to transmit and receive signals. Moreover, WLANs, such as those based on the IEEE 802.11n or IEEE 802.11ac standards, can use OFDM and MIMO.

Beamforming (e.g., transmit beamforming) may be used to increase the reliability and/or range of communication (e.g., a communication link) between an AP and a STA. In some examples, beamforming may include performing channel sounding between a beamformer and a beamformee. A beamformer may be a transmitter (Tx), and a beamformee may be a receiver (Rx). For example, a beamformer may be an AP, and a STA may be a beamformee. In some examples, a beamformer may transmit beamformed physical layer convergence protocol (PLOP) protocol data unit (PPDU) frames, and a beamformee may receive beamformed PPDU frames.

Information may be transmitted and received by APs and/or STAs in the wireless network. For example, information may be transmitted as a unicast (UC) transmission or a multicast (MC) transmission from an AP in the wireless network to STAs in the wireless network. As used herein, a "unicast" transmission is a transmission in which information and/or frames are transmitted to a single STA, while a "multicast" transmission is a transmission in which information and/or frames are transmitted to a group of STAs. As used herein, information is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format such as a plurality of packets, frames, or cells.

In some approaches, MU capable STAs associated with a MC group may not be assigned to a MU group. For example, some MU capable STAs associated with a MC group may not be added to a MU group prior to transmission of a MC frame. Further, in some approaches, MU capable STAs associated with a same MC group may be grouped into different MU groups, which may increase an amount of time and/or bandwidth associated with transmission and/or receipt of MC traffic.

In some approaches, the quality of a MC transmission (e.g., a multicast video transmission) in a wireless network may be increased by the implementation of multicast to unicast conversion. However, performing a full MC to UC conversion may include transmitting a plurality of replicated MC frames. This may increase bandwidth consumption associated with the MC transmission and/or may lead to channel saturation in the wireless network.

In contrast, examples herein may allow for STAs to be assigned to MU groups based on characteristics of MC groups to which the STAs are assigned. For example, STAs may be assigned to MU groups based on an average traffic load for each MC group, an average transmission rate for each STA in each MC group, a time cost associated with each MC group, etc. In some examples, a sorted list of MC candidates for MU grouping may be generated based on the characteristics of the MC groups. The sorted list may facilitate assignment of STAs having similar characteristics into a same MU group.

In some examples, STAs may be assigned to various groups. For example, STAs may be assigned to various multicast (MC) groups and/or MU capable STAs may be assigned to various MU groups. In some approaches, assigning the STAs to groups may be based on a type of traffic transmitted and/or received by the STAs. For example, a set of STAs may be assigned to a particular MU group such that MC traffic transmitted and/or received by the STAs is optimized.

STAs may be grouped into various MU-MIMO groups based on characteristics associated with the STAs. For example, STAs may be grouped into MU-MIMO groups such that an amount of channel air time and/or channel saturation may be reduced in comparison to some approaches. Information regarding a capability of STAs associated with the wireless network to receive frames may be determined and/or estimated. In some examples, the STAs may be MU-capable STAs. STAs associated with a same MC group may be grouped into a same MU-MIMO group, and multi-use transmit beamformed (MU-TxBF) frames may be transmitted to the STAs. In some examples, this may reduce an amount of channel air time and/or channel saturation associated with channels in the wireless network. As used herein, "channel air time" is an amount of time associated with transmitting data to or from an AP to a particular STA in a wireless network.

Examples of the present disclosure include apparatuses and machine-readable media storing executable instructions for multicast multi-user grouping. In some examples, an apparatus may comprise a processing resource. The processing may execute instructions to perform various tasks. For example, the processing resource may execute instructions to rank a plurality of stations associated with the apparatus based, at least in part, on a characteristic associated with a first multicast group containing a first set of stations among the plurality of stations, and a characteristic associated with a second multicast group containing a second set of stations among the plurality of stations. In some examples, the processing resource may execute instructions to assign a first group of stations from the first multicast group and the second multicast group to a first multi-user group and assign a second group of stations from the first multicast group and the second multicast group to a second multi-user group. The processing resource may execute instructions to convert a multicast frame associated with a station from the first multi-user group to a unicast frame, and transmit the unicast frame to each station in the first multi-user group.

Turning now to the figures, FIG. 1 illustrates a diagram of an example of a wireless network 100 consistent with the disclosure. Wireless network 100 may include an access point (AP) 102 and a plurality of stations (STAs) 104-1, 104-2, 104-3, . . . , 104-N (referred to generally herein as STAs 104). As indicated by the dotted lines between the AP 102 and the STAs 104, the AP 102 can provide wireless connectivity to STAs 104 in the wireless network 100. In some examples, wireless connectivity may be provided between the AP 102 and the STAs 104 using spread-spectrum or orthogonal frequency-division multiplexing (OFDM) techniques.

Figure 2:
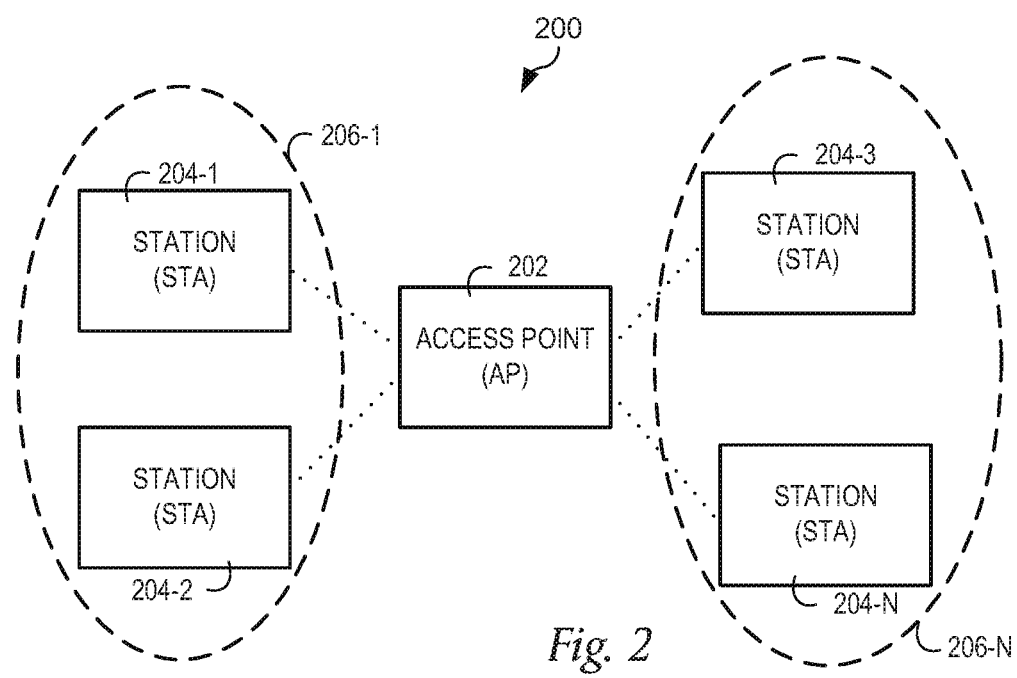
FIG. 2 illustrates a diagram of an example of a wireless network where stations are grouped into multicast groups consistent with the disclosure.

FIG. 2 illustrates a diagram of an example of a wireless network 200 where STAs are grouped into multicast groups consistent with the disclosure. In the example illustrated in FIG. 2, wireless network 200 may include an AP 202 and a plurality of STAs 204. As indicated by the dotted lines between the AP 202 and the STAs 204, the AP 202 can provide wireless connectivity to STAs 204 in the wireless network 200. In some examples, STAs 204-1 and 204-2 may be part of a first MC group 206-1, and STAs 204-3 and 204-N may be part of a second MC group 206-N. Although two MC groups 206-1 and 206-N (referred to generally herein as MC groups 206) are shown in FIG. 2, the STAs 204 may be part of more or fewer MC groups.

In some examples, the AP 202 may receive information regarding characteristics of the STAs 204. This information may be received during run time associated with the AP 202 and/or STAs 204. The information regarding the characteristics of the STAs 204 may be used to evaluate STAs that may be candidates for MU grouping (e.g., MU-MIMO grouping). For example, the AP 202 may receive information from the STAs 204 regarding MC group membership of the STAs 204. In some examples, MC group membership may be determined via internet group management protocol (IGMP) snooping.

The AP 202 may receive information regarding capabilities of the STAs 204. For example, the AP may receive information that includes which STAs 204 are MU capable and/or information regarding traffic streams received by the STAs 204. In some examples, the information regarding traffic streams received by the STAs 204 may be determined based on association/dissociation sessions between the AP 202 and the STAs 204.

In some examples, the AP 202 may determine and/or store information regarding an average traffic load (AMTL) for the MC groups 206-1, . . . , 206-N and/or an average transmission rate (ATR) associated with each STA 204-1, 204-2, 204-3, . . . , 204-N. The AMTL for the MC groups 206 may be based on a total length of a MC frame associated with a respective MC group (e.g., a MC frame associated with MC group 206-1) over a given time duration. The ATR associated with each STA 204-1, 204-2, 204-3, . . . , 204-N may be based on a total length of a data frame associated with a respective STA (e.g., a data frame associated with STA 204-1) over a total transmission air time in a given time duration.

In some examples, the AP 204 may maintain a run time table including, for example, MC group membership, AMTL for each MC group, and/or a list of MU capable STAs and/or ATRs associated with the MU capable STAs associated with the network. An example of a run time table is shown below in Table 1:

TABLE 1

| MC Group | AMTL | MU-capable STAs |
|---|---|---|
| MC1 | 5 Mbps | STA1/ATR(STA1), STA3/ATR(STA3), . . . |
| MC2 | 3 Mbps | STA2/ATR(STA2), STA7/ATR(STA7), . . . |

In some examples, the MC groups 206 may be evaluated for MU grouping. For examples, the AP 202 may evaluate the MC groups 206 to determine if the MC groups are candidates for MU grouping. In some examples, the MC groups 206 may be evaluated periodically so that changes in the wireless network over time may be taken into account. In some examples, MC groups 206 that meet certain conditions may be candidates for MU grouping. For example, MC groups 206 that include MU capable STAs 204 and/or MC groups 206 that meet or exceed a threshold (e.g., an AMTL threshold, ATR threshold, etc.) may be candidates for MU grouping.

In some examples, MC groups 206 that may be candidates for MU grouping may be prioritized by comparing a time cost associated with each MC group 206. This may allow for the MC groups 206 to be ranked based on characteristics associated therewith such that MC groups 206 with a higher priority than other MC groups 206 may be selected for MU grouping. In some examples, for N MU capable STAs (e.g., STAs 204-1 and 204-2) associated with a respective MC group (e.g., MC group 206-1) a time cost (MCT) associated with the MC group x (e.g., MC group 206-1) for a previous time period may be determined using Equation 1:

$$MCT(x) = \sum_{i=0}^{n} \frac{AMTL(x)}{ATR(i)} \quad \text{(Equation 1)}$$

In Equation 1, AMTL(x) is an average MC traffic load of an $x^{th}$ MC group (e.g., MC group 206-1), and ATR(i) is an average transmission rate associated with an $i^{th}$ STA (e.g., STA 204-1) associated with the MC group (e.g., MC group 206-1). In some examples, the MC groups 206 may be sorted and/or ranked based on the value of MCT(x) for each MC group 206. In some examples, Equation 1 may be used to estimate a time cost of a subsequent time period, because the time cost of the previous time period determined using Equation 1 may be similar to a time cost of a subsequent time period. For example, an MC group (e.g., MC group 206-1) with a largest MCT among the MC groups 206 may be ranked highest, while an MC group (e.g., MC group 206-N) with a smallest MCI among the MC groups may be ranked lowest. In some examples, the larger the MCI, the higher the priority of the MC group for MU grouping.

Figure 3:
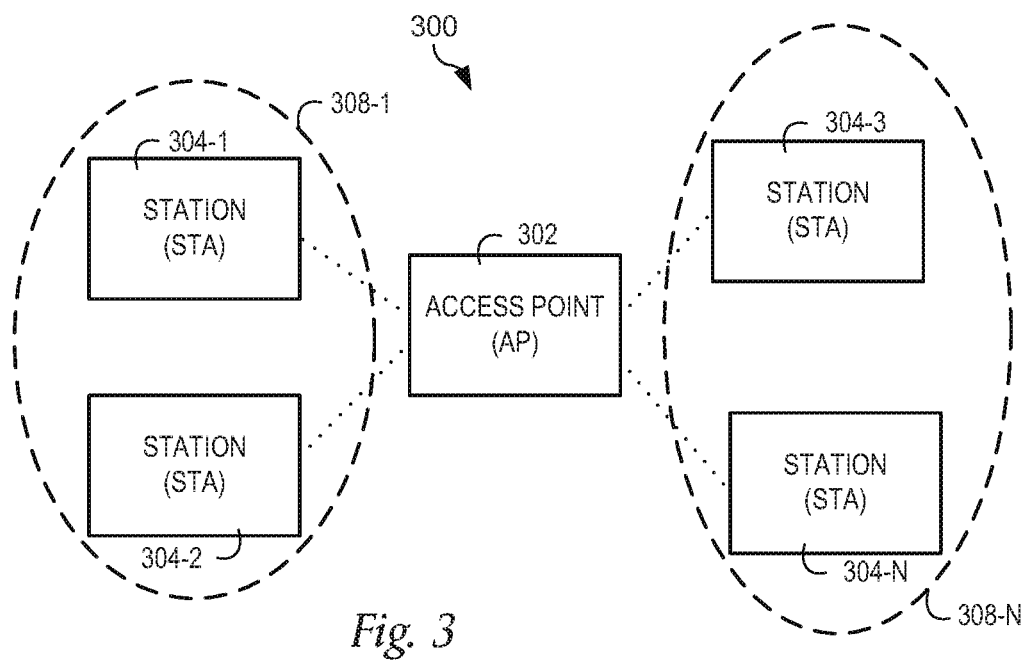
FIG. 3 illustrates a diagram of an example of a wireless network where stations are grouped into multi-user groups consistent with the disclosure.

FIG. 3 illustrates a diagram of an example of a wireless network 300 where STAs 304 are grouped into MU groups 308-1, . . . , 308-N consistent with the disclosure. In some examples, the MU groups 308-1, . . . , 308-N may be MU-MIMO groups. In the example illustrated in FIG. 3, wireless network 300 may include an AP 302 and a plurality of STAs 304. As indicated by the dotted lines between the AP 302 and the STAs 304, the AP 302 can provide wireless connectivity to STAs 304 in the wireless network 300. In some examples, STAs 304-1 and 304-2 may be assigned to a first MU group 308-1, and STAs 304-3 and 304-N may be assigned to a second MU group 308-N. Although two MU groups 308-1 and 308-N are shown in FIG. 3, the STAs 304 may be assigned to more or fewer MU groups.

In some examples, MU groups 308-1, . . . , 308-N may be assigned such that STAs 304 that have a similar receive capability may assigned to a same MU group 308-1, . . . , 308-N. The receive capability of STAs 304 may be determined based on an average moving transmission rate (AMTR) over a preceding n records. In some examples, the AMTR of each STA 304 may be determined using Equation 2:

$$AMTR(x, n) = \sum_{i=0}^{n} \frac{ATRL(x, i)}{n} \quad \text{(Equation 2)}$$

where ATRL(x,i) is the last $i^{th}$ record of AMTR for an $x^{th}$ STA 304.

Tables 2-4 illustrate an example of sorting STAs 304 associated with a respective MC group (e.g., MC groups 206 illustrated in FIG. 2) and assigning STAs to MU groups 308. In the examples shown in Tables 2-4, consider an MC group 306 including 6 MU capable STAs: STA1, STA2, . . . , STA6. These STAs may correspond to STAs 204 illustrated in FIG. 2, and STAs 304 illustrated in FIG. 3.

Table 2 illustrates an example of 6 MU capable STAs associated with a respective MC group prior to sorting. As shown in Table 2, each respective STA in the MC group has an AMTR associated therewith:

TABLE 2

| STA1 | AMTR = 150 |
|---|---|
| STA2 | AMTR = 54 |
| STA3 | AMTR = 300 |
| STA4 | AMTR = 11 |
| STA5 | AMTR = 24 |
| STA6 | AMTR = 48 |

Table 3 illustrates an example ranking of the STAs shown in Table 2 subsequent to being sorted based on their respective AMTRs:

TABLE 3

| STA4 | AMTR = 11 |
|---|---|
| STA5 | AMTR = 24 |
| STA6 | AMTR = 48 |
| STA2 | AMTR = 54 |
| STA1 | AMTR = 150 |
| STA3 | AMTR = 300 |

In this example, if the maximum number of STAs that may be assigned to a respective MU group 308 is 4, the STAs 304 may be assigned to MU groups 308 as shown in Table 4:

TABLE 4

| STA4 | MU Group A | AMTR = 11 |
|---|---|---|
| STA5 | MU Group A | AMTR = 24 |
| STA6 | MU Group A | AMTR = 48 |
| STA2 | MU Group A | AMTR = 54 |
| STA1 | MU Group B | AMTR = 150 |
| STA3 | MU Group B | AMTR = 300 |

Figure 4:
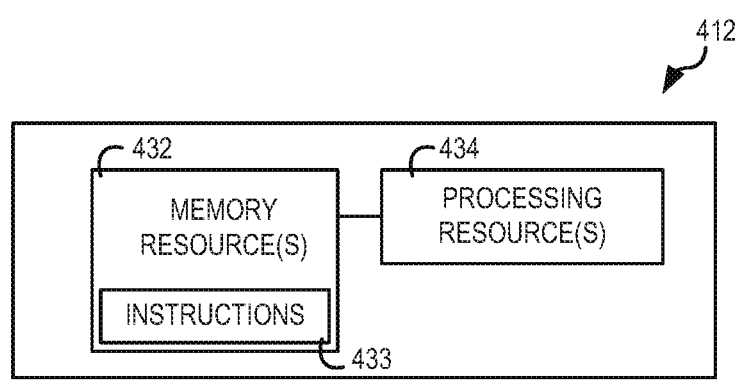
FIG. 4 illustrates an example apparatus for multicast multi-user group consistent with the disclosure.

FIG. 4 illustrates an apparatus for multicast multi-user grouping consistent with the disclosure. As shown in FIG. 4, the apparatus 412 may include memory resource(s) 432 and/or processing resource(s) 434. By way of example, the memory resource(s) 432 may include volatile and/or non-volatile memory, and the processing resource(s) 434 may include processors, microprocessors, etc. In some examples, the processing resource(s) 434 may be included in an AP (e.g., AP 202/302 illustrated in FIGS. 2 and 3). However, examples are not so limited, and the memory resource(s) 432 and/or processing resource(s) 434 may be included in a controller (e.g., a network controller).

The processing resource(s) 434 may execute instructions 433 to perform various functions and/or tasks. In some examples, the instructions 433 may be stored by the memory resource(s) 434. In some examples, the instructions 433 may be stored on a non-transitory machine-readable medium.

In some examples, the processing resource(s) 434 may execute instructions 433 to rank a plurality of stations (STAs) associated with the apparatus based, at least in part, on a characteristic associated with a first multicast (MC) group containing a first set of STAs among the plurality of STAs and a characteristic associated with a second MC group containing a second set of STAs among the plurality of STAs. The processing resource(s) 434 may execute instructions 433 to assign a first group of STAs from the first MC group and the second MC group to a first multi-user (MU) group, and assign a second group of STAs from the first MC group and the second MC group to a second MU group. The characteristic for the first MC group may be based, at least in part, on an average traffic load associated with the first MC group, and the characteristic for the second MC group may be based, at least in part, on an average traffic load associated with the second MC group.

In some examples, the processing resource(s) 434 may execute instructions 433 to convert a MC frame associated with a STA from the first MU group to a unicast (UC) frame and/or transmit the UC frame to each STA in the first MU group.

The processing resource(s) 434 may execute instructions 433 to convert a MC frame associated with a STA from the second MU group to a UC frame, and transmit the UC frame to each STA in the second MU group. In some examples, each STA among the plurality of STAs may be a MU-capable STA, and the UC frame may be transmit beamformed to each STA in the first MU group. The processing resource(s) 434 may execute instructions 433 to check for physical layer (PHY) compatibility prior to transmitting the UC frame to the first or second MU group.

Figure 5:
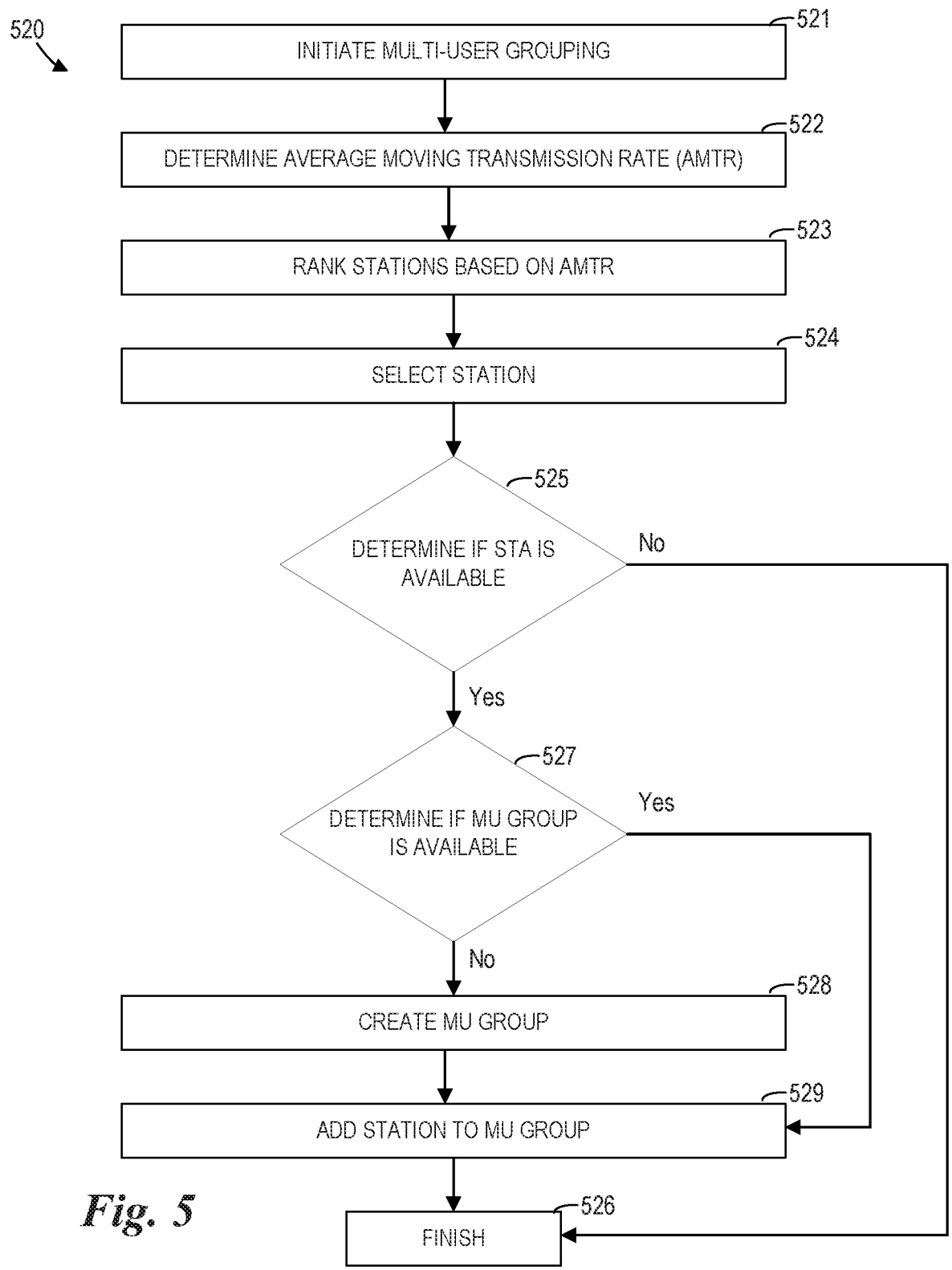
FIG. 5 illustrates an example flow diagram for multicast multi-user group consistent with the disclosure.

FIG. 5 illustrates an example flow diagram 520 for multicast multi-user grouping consistent with the disclosure. At 521, multi-user grouping may be initiated. In some examples, information regarding characteristics of MC group membership may be determined. For example, a determination regarding particular STAs that are associated with respective MC groups may be made, as described in more detail in connection with FIG. 2, herein.

At 522, an AMTR associated with each respective STA may be determined. In some examples, the AMTR for each respective STA may be determined using Equation 2. At 523, STAs may be ranked and/or sorted based, at least in part, on their respective AMTRs, as illustrated in the example accompanying Tables 2-4.

At 524, a station may be selected for MU grouping. As described in connection with FIGS. 2 and 3, as well as Tables 2-4, the STA may be selected for MU grouping based on a receive capability associated with the STA. For example, STAs with similar receive capabilities may be candidates to be assigned to a same MU group.

At 525, a determination regarding whether a STA is available for MU grouping may be made. If there is no STA available for MU grouping, at 526, the multicast multi-group grouping may finish. If there is a STA available for MU groping, at 527 a determination regarding whether there is an available MU group may be made. If it is determined that an MU group is available, the STA may be added to the MU group at 528. If it is determined that an MU group is not available, an MU group may be created, for example, at 528. Once the MU group has been created at 528, the STA may then be added to the MU group at 529.

In some examples, once STAs associated with respective MC groups have been assigned to respective MU groups, frames may be transmitted to the MC groups and/or MU groups. For example, an MC frame associated with a respective MC group may be converted to a unicast (UC) frame for the MC group. If there is an MU group assigned to the respective MC group, UC frames may be created based on the MC frame for the MC group, and the UC frames may be transmitted to the STAs associated with the respective MU group. In some examples, the UC frames may be replicated UC frames. The replicated UC frames may be assembled based on the MC frame associated with STAs which are assigned to a same MU group. In some examples, the UC frames may be assembled into a same MU PPDU and transmitted to STAs in the MU group.

Figure 6:
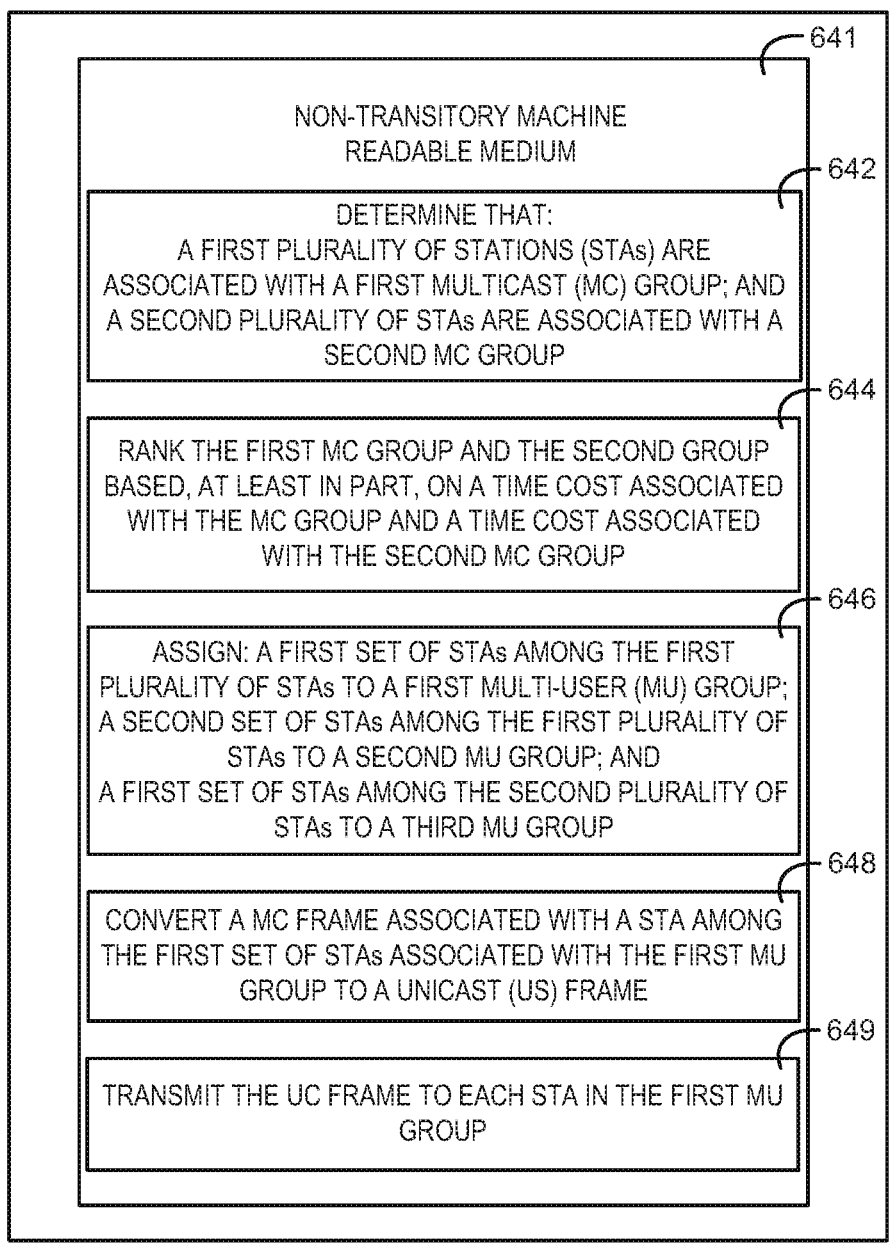
FIG. 6 illustrates a diagram of an example of a non-transitory computer readable medium for multicast multi-user group consistent with the disclosure.

FIG. 6 illustrates a diagram of an example of a non-transitory machine readable medium 641 for multicast multi-user grouping consistent with the disclosure. A processing resource may execute instructions stored on the non-transitory machine readable medium 641. The non-transitory machine readable medium 641 may be any type of volatile or non-volatile memory or storage, such as random access memory (RAM), flash memory, read-only memory (ROM), storage volumes, a hard disk, or a combination thereof.

The example medium 641 may store instructions 642 executable by a processing resource to determine that a first plurality of stations (STAs) are associated with a first multicast (MC) group, and a second plurality of STAs are associated with a second MC group.

The example medium 641 may store instructions 644 executable by a processing resource to rank the first MC group and the second MC group based, at least in part, on a time cost associated with the first MC group and a time cost associated with the second MC group. The time cost associated with the first MC group may be based, at least in part, on an average traffic load and an average transmission rate associated with the first MC group, and the time cost associated with the second MC group may be based, at least in part, on an average traffic load and an average transmission rate associated with the second MC group.

In some examples, the example medium 641 may store instructions 646 executable by a processing resource to assign a first set of STAs among the first plurality of STAs to a first MU group, a second set of STAs among the first plurality of STAs to a second MU group, and a first set of STAs among the second plurality of STAs to a third MU group.

The example medium 641 may store instructions 648 executable by a processing resource to convert a MC frame associated with a STA among the first set of STAs associated with the first MU group to unicast (UC) frame. In some examples, the example medium 641 may store instructions 649 executable by a processing resource to transmit the UC frame to each STA in the first MU group.

The example medium 641 may further store instructions executable by a processing resource to convert a MC frame associated with a STA among the second set of STAs associated with the second MU group to unicast (UC) frame, transmit the UC frame to each STA in the second MU group, convert a MC frame associated with a STA among the first set of STAs associated with the third MU group to unicast (UC) frame, and transmit the UC frame to each STA in the third MU group.

In some examples, the example medium 641 may further store instructions executable by a processing resource to re-assign a particular STA among the plurality of STAs among the first set of STAs from the first MU group to the second MU group, based at least in part on an average moving transmission rate (AMTR) of each STA among the plurality of STAs associated with the first MC group and each STA among the plurality of STAs associated with the second MC group. In some examples, the AMTR associated with the particular STA among the first set of STAs may be greater than the AMTR associated with a particular STA among the second set of STAs from the second MU group.

Figure 7:
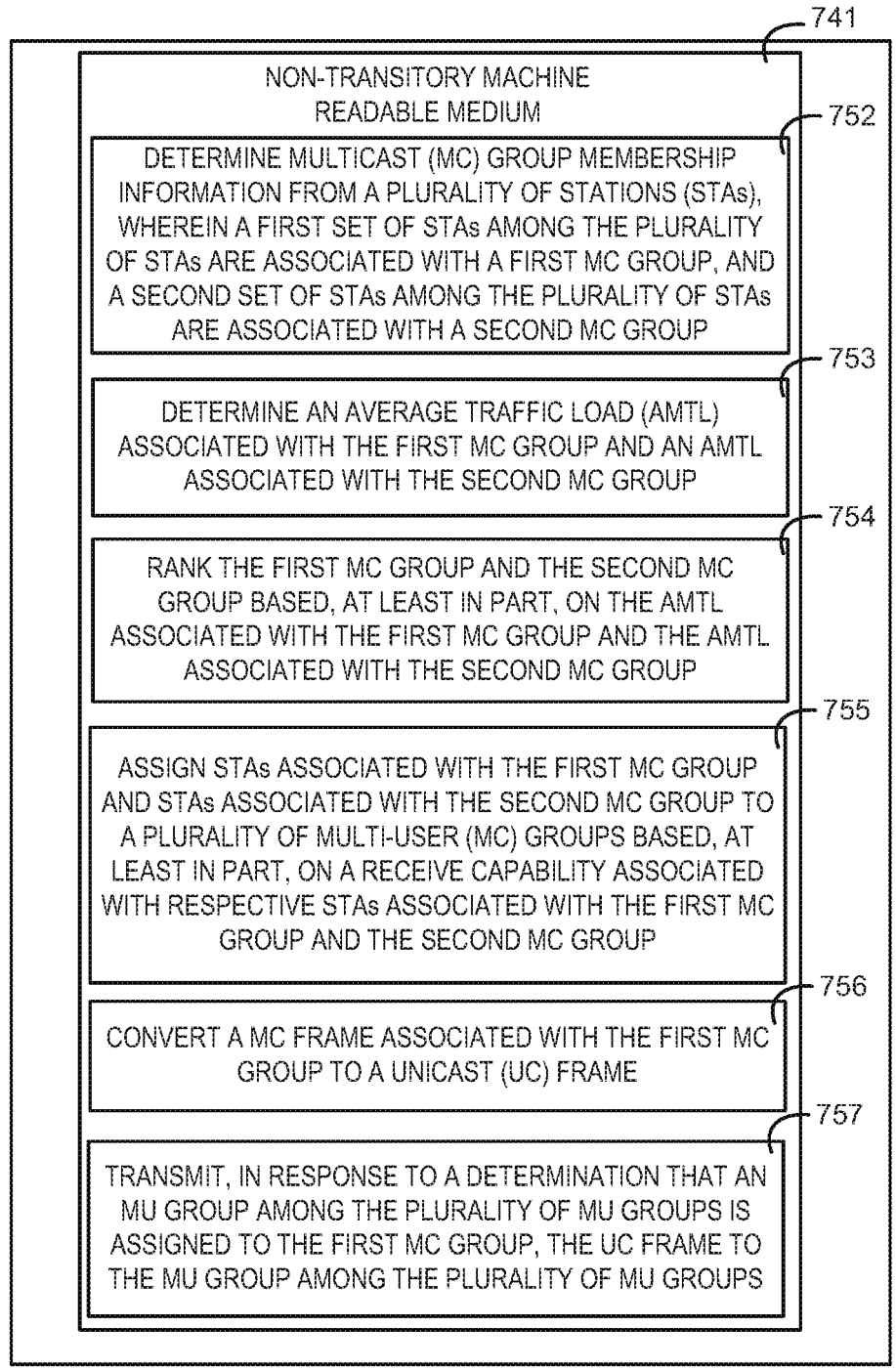
FIG. 7 illustrates another diagram of an example of a non-transitory computer readable medium for multicast multi-user group consistent with the disclosure.

FIG. 7 illustrates another diagram of an example of a non-transitory machine readable medium 741 for multicast multi-user grouping consistent with the disclosure. A processing resource may execute instructions stored on the non-transitory machine readable medium 741. The non-transitory machine readable medium 741 may be any type of volatile or non-volatile memory or storage, such as random access memory (RAM), flash memory, read-only memory (ROM), storage volumes, a hard disk, or a combination thereof.

The example medium 741 may store instructions 752 executable by a processing resource to determine multicast (MC) group membership information from a plurality of stations (STAs), wherein a first set of STAs among the plurality of STAs are associated with a first MC group, and a second set of STAs among the plurality of STAs are associated with a second MC group.

In some examples, the example medium 741 may store instructions 753 executable by a processing resource to determine an average traffic load (AMTL) associated with the first MC group and an AMTL associated with the second MC group.

The example medium 741 may store instructions 754 executable by a processing resource to rank the first MC group and the second MC group based, at least in part, on the AMTL associated with the first MC group and the AMTL associated with the second MC group.

The example medium 741 may store instructions 755 executable by a processing resource to assign STAs associated with the first MC group and STAs associated with the second MC group to a plurality of multi-user (MU) groups based, at least in part, on a receive capability associated with respective STAs associated with the first MC group and the second MC group.

In some examples, the example medium 741 may store instructions 756 executable by a processing resource to convert a MC frame associated with the first MC group to a unicast (UC) frame.

The example medium 741 may store instructions 757 executable by a processing resource to transmit, in response to a determination that an MU group among the plurality of MU groups is assigned to the first MC group, the UC frame to the MU group among the plurality of MU groups.

In some examples, the example medium 741 may further store instructions executable by a processing resource to determine a time cost associated with the first MC group based, at least in part, on the AMTL associated with the first MC group and an average transmission rate of each STA associated with the first MC group, and determine a time cost associated with the second MC group based, at least in part, on the AMTL associated with the second MC group and an average transmission rate of each STA associated with the second MC group.

The example medium 741 may store instructions executable by a processing resource to determine MC group membership information from the plurality of STAs based, at least in part, on internet group management protocol snooping.

In the foregoing detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, designators such as "N", etc., particularly with respect to reference numerals in the drawings, indicate that a number of the particular feature so designated can be included. As used herein, "a number of" a particular thing can refer to one or more of such things (e.g., a number of computing devices can refer to one or more computing devices). A "plurality of" is intended to refer to more than one of such things. Multiple like elements may be referenced herein generally by their reference numeral without a specific identifier at the end. For example, a plurality of STAs 104-1, . . . , 104-N may be referred to herein generally as STAs 104.

The figures herein follow a numbering convention in which the first digit corresponds to the drawing figure number and the remaining digits identify an element or component in the drawing. For example, reference numeral 204 may refer to element "04" in FIG. 2 and an analogous element may be identified by reference numeral 304 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, for example, various forms of transistor logic, application specific integrated circuits (ASICs), etc., as opposed to computer executable instructions, for example, instructions, etc., stored in memory and executable by a processor.

What is claimed is:
1. An apparatus, comprising:
a processing resource to execute instructions to:
rank a plurality of stations (STAs) associated with the apparatus based, at least in part, on a characteristic associated with a first multicast (MC) group containing a first set of STAs among the plurality of STAs and a characteristic associated with a second MC group containing a second set of STAs among the plurality of STAs, wherein the characteristic for the first MC group is based, at least in part, on an average traffic load associated with the first MC group, and wherein the characteristic for the second MC group is based, at least in part, on an average traffic load associated with the second MC group;

assign a first group of STAs from the first MC group and the second MC group to a first multi-user (MU) group;
assign a second group of STAs from the first MC group and the second MC group to a second MU group;
convert a MC frame associated with a STA from the first MU group to a unicast (UC) frame; and
transmit the UC frame to each STA in the first MU group.

2. The apparatus of claim 1, wherein the processing resource is to execute instructions to:
convert a MC frame associated with a STA from the second MU group to a UC frame; and
transmit the UC frame to each STA in the second MU group.

3. The apparatus of claim 1, wherein the UC frame is transmit beamformed to each STA in the first MU group.

4. The apparatus of claim 1, wherein each STA among the plurality of STAs is a MU-capable STA.

5. The apparatus of claim 1, wherein the processing resource is included in a network controller.

6. The apparatus of claim 1, wherein the processing resource is included in an access point.

7. A non-transitory machine-readable medium storing instructions executable by a processing resource to:
determine that:
a first plurality of stations (STAs) are associated with a first multicast (MC) group; and
a second plurality of STAs are associated with a second MC group;
rank the first MC group and the second MC group based, at least in part, on a time cost associated with the first MC group and a time cost associated with the second MC group;
assign:
a first set of STAs among the first plurality of STAs to a first multi-user (MU) group;
a second set of STAs among the first plurality of STAs to a second MU group; and
a first set of STAs among the second plurality of STAs to a third MU group;
convert a MC frame associated with a STA among the first set of STAs associated with the first MU group to unicast (UC) frame; and
transmit the UC frame to each STA in the first MU group.

8. The non-transitory machine-readable medium of claim 7, wherein the instructions are executable by the processing resource to:
convert a MC frame associated with a STA among the second set of STAs associated with the second MU group to unicast (UC) frame;
transmit the UC frame to each STA in the second MU group;
convert a MC frame associated with a STA among the first set of STAs associated with the third MU group to unicast (UC) frame; and
transmit the UC frame to each STA in the third MU group.

9. The non-transitory machine-readable medium of claim 7, wherein the time cost associated with the first MC group is based, at least in part, on an average traffic load and an average transmission rate associated with the first MC group, and wherein
the time cost associated with the second MC group is based, at least in part, on an average traffic load and an average transmission rate associated with the second MC group.

10. The non-transitory machine-readable medium of claim 7, wherein the instructions are executable by the processing resource to:
re-assign a particular STA among the first set of STAs from the first MU group to the second MU group, based at least in part on an average moving transmission rate (AMTR) of:
each STA among the plurality of STAs associated with the first MC group; and
each STA among the plurality of STAs associated with the second MC group.

11. The non-transitory machine-readable medium of claim 10, wherein the AMTR associated with the particular STA among the first set of STAs is greater than the AMTR associated with a particular STA among the second set of STAs from the second MU group.

12. A non-transitory machine-readable medium storing instructions executable by a processing resource to:
determine multicast (MC) group membership information from a plurality of stations (STAs), wherein a first set of STAs among the plurality of STAs are associated with a first MC group, and a second set of STAs among the plurality of STAs are associated with a second MC group;
determine an average traffic load (AMTL) associated with the first MC group and an AMTL associated with the second MC group;
rank the first MC group and the second MC group based, at least in part, on the AMTL associated with the first MC group and the AMTL associated with the second MC group;
assign STAs associated with the first MC group and STAs associated with the second MC group to a plurality of multi-user (MU) groups based, at least in part, on a receive capability associated with respective STAs associated with the first MC group and the second MC group;
convert a MC frame associated with the first MC group to a unicast (UC) frame; and
transmit, in response to a determination that an MU group among the plurality of MU groups is assigned to the first MC group, the UC frame to the MU group among the plurality of MU groups.

13. The non-transitory machine-readable medium of claim 12, wherein the instructions are executable by the processing resource to:
determine a time cost associated with the first MC group based, at least in part, on the AMTL associated with the first MC group and an average transmission rate of each STA associated with the first MC group; and
determine a time cost associated with the second MC group based, at least in part, on the AMTL associated with the second MC group and an average transmission rate of each STA associated with the second MC group.

14. The non-transitory machine-readable medium of claim 12, wherein the instructions are executable by the processing resource to determine MC group membership information from the plurality of STAs based, at least in part, on internet group management protocol snooping.

15. A method, comprising:
ranking, by a processor of an access point, a plurality of stations (STAs) associated with the access point based, at least in part, on a characteristic associated with a first multicast (MC) group containing a first set of STAs among the plurality of STAs and a characteristic associated with a second MC group containing a second set of STAs among the plurality of STAs, wherein the characteristic for the first MC group is based, at least in part, on an average traffic load associated with the first MC group, and wherein the characteristic for the second MC group is based, at least in part, on an average traffic load associated with the second MC group;

assigning, by the processor, a first group of STAs from the first MC group and the second MC group to a first multi-user (MU) group;

assigning, by the processor, a second group of STAs from the first MC group and the second MC group to a second MU group;

converting, by the processor, a MC frame associated with a STA from the first MU group to a unicast (UC) frame; and transmitting, by the processor, the UC frame to each STA in the first MU group.

16. The method of claim 15 further comprising:

converting, by the processor, a MC frame associated with a STA from the second MU group to a UC frame; and transmitting, by the processor, the UC frame to each STA in the second MU group.

17. The method of claim 15, wherein the UC frame is transmit beamformed to each STA in the first MU group.

18. The method of claim 15, wherein each STA among the plurality of STAs is a MU-capable STA.

\* \* \* \* \*